United States Patent
Franzoni et al.

(10) Patent No.: US 6,533,102 B2
(45) Date of Patent: Mar. 18, 2003

(54) DEVICE FOR CLEANING A CONVEYOR BELT

(75) Inventors: Luigi Franzoni, Imola (IT); Massimo Dovadola, Lugo (IT)

(73) Assignee: CEFLA Soc. Coop. a.r.l., Bologna (IT)

( * ) Notice: Subject to any disclaimer, the term of this patent is extended or adjusted under 35 U.S.C. 154(b) by 22 days.

(21) Appl. No.: 09/812,576

(22) Filed: Mar. 21, 2001

(65) Prior Publication Data

US 2001/0023814 A1 Sep. 27, 2001

(30) Foreign Application Priority Data

Mar. 24, 2000 (IT) ......................... GE00A0046

(51) Int. Cl.[7] .......................... B65G 45/00; B65G 45/22
(52) U.S. Cl. ......................... 198/495; 198/498; 198/501
(58) Field of Search ................................ 198/494, 496, 198/497, 498, 501, 495

(56) References Cited

U.S. PATENT DOCUMENTS

| | | | | |
|---|---|---|---|---|
| 3,815,728 A | * | 6/1974 | Vaughan ..................... | 198/495 |
| 4,860,883 A | * | 8/1989 | Knaul et al. ................ | 198/495 |
| 4,934,512 A | * | 6/1990 | Lin et al. .................... | 198/338 |
| 4,976,342 A | * | 12/1990 | Hwang ........................ | 198/495 |
| 5,147,028 A | * | 9/1992 | Raggi ......................... | 101/425 |
| 5,355,992 A | * | 10/1994 | Baig et al. .................. | 198/495 |
| 5,421,448 A | * | 6/1995 | Falcioni ...................... | 198/498 |
| 5,613,594 A | * | 3/1997 | Kootsouradis ............. | 15/256.5 |
| 5,797,063 A | * | 8/1998 | Umezawa et al. ......... | 198/494 |

* cited by examiner

Primary Examiner—Joseph E. Valenza
Assistant Examiner—Richard Ridley
(74) Attorney, Agent, or Firm—Larson & Taylor PLC

(57) ABSTRACT

The vessel or vessels (7, 7', 7") in contact with the solvent used for cleaning the conveyor (T) are designed and arranged in such a way that they are enclosed, and the portion of conveyor belt which is wetted with solvent is also isolated by suitable means from contact with the external environment containing the ventilation air of the painting chamber. In a preferred solution, where rotating scraping cylinders (1, 5) are used, the solvent vessel (7, 7', 7") is placed in such a way that it is enclosed by the two successive cleaning cylinders, by the portion of conveyor belt which runs between these cylinders, and by its lateral walls which are as close as possible to the said cylinders and to the said portion of the conveyor belt. At the end of each painting cycle, clean solvent is made to flow into the solvent vessel and the cleaning cylinders and the conveyor belt of the painting machine are temporarily kept active so that they clean themselves.

9 Claims, 3 Drawing Sheets

DEVICE FOR CLEANING A CONVEYOR BELT

DESCRIPTION

The present invention relates to a device for removing a fluid substance from a conveyor belt closed on itself to form a loop and running around at least two end rollers, at least one of which is powered.

In particular, the invention relates to conveyor belts of machines and installations for painting, colouring or impregnation processes, described more simply as "painting" in the following text, which make the articles to be treated pass through a chamber for spraying the fluid treatment substance, for example the paint.

The conveyor belt has two branches: an upper, outgoing branch, on which are placed the articles to be treated and which is struck by the sprays of paint, and a lower return branch, which is splashed with paint and which has to be cleaned before it returns to the upper level, to enable the conveyor to receive new articles to be painted and to enable the removed paint to be recovered.

The devices in use at the present time for cleaning the belt comprise, in the first place, means for wetting the surface to be cleaned with solvent and subsequent means for removing the paint fluidized by the solvent, by a scraping or shaving operation, for example by means of fixed scraper blades or by means of rotating cylinders.

FIG. 1 of the attached drawing shows an example of a cleaning device with double reverse cylinders, of the type described in European patent EP 425969 held by the applicant. In this figure, the letter T indicates the final part of the conveyor of the painting machine, with its upper branch T1 and lower branch T2 running around the roller R. The cleaning device comprises a first preliminary cleaning cylinder 1, opposite and parallel to the roller R, which operates in contact with the branch T2 of T, and is made to rotate by suitable means in such a way that its periphery moves in the opposite direction to that of the branch T2, to carry out an effective action of scraping this branch and to remove from it the recovered paint which is then readily removed from the cylinder 1, by the scraping edge 102 of a trough 2 in which the recovered paint is collected and then removed and recycled by suitable means. The cylinder 1 is partially immersed in a vessel 3 containing solvent, so that the cylinder cleans itself and carries a film of the solvent into the area of contact with the lower branch T2 of T, to wet the area from which the paint is removed, and to cause the said branch T2 to leave the cylinder 1 with a small amount of solvent which has the function of softening any residual traces of paint.

Downstream from the preliminary cleaning cylinder 1 there is a finishing cylinder 5, parallel to the cylinder 1 and rotating in the same direction, which operates in contact with the branch T2 of T to remove any residual traces of paint and the film of solvent initially transferred on to T2. The paint and solvent recovered by the cylinder 5 are removed from it by the scraping edge 106 of a trough 6, in which the recovered fluid material is collected, and is then recycled together with that collected by the trough 2.

The number 4 indicates idle counter-rollers which can if necessary be provided in the various positions in which the cleaning means exert a thrust against the branch T2 of T, in order to oppose this thrust and make the action of the cleaning means more efficient.

In a system for cleaning the belt T of the type illustrated in FIG. 1, or in other known systems which comprise a succession of belt scraping units and open-topped vessels for wetting the belt with solvent and for collecting the recovered paint, the following drawbacks are encountered:

a) high evaporation of solvent from the said open-topped vessels and from the surface of the conveyor to which the solvent is applied. In this respect it should be pointed out that the whole of the cleaning equipment is located in a lower extension of the painting chamber, subject to the action of ventilation means which draw air from this chamber and discharge into the atmosphere through means of suppressing polluting products. The large surfaces affected by the solvent and by the ventilation air flow therefore cause a considerable evaporation of the solvent, which consequently becomes even less effective in its specified function;

b) it is necessary to empty and clean or replace periodically the vessel 3 of solvent under the cylinder 1 and the solvent recovery trough 6, since the recovered paint or the residue of the paint-contaminated solvent tend to accumulate on their walls;

c) whenever a painting cycle ends, the cylinders 1 and 5 have to be cleaned manually by the operators, at the cost of considerable inconvenience for them. The quality of cleaning also depends on the ability and frequently on the scrupulousness of the operators, which are not always constant factors.

The invention is designed to overcome these and other drawbacks of the known art with the following idea for a solution.

The vessel or vessels in contact with the solvent are designed and positioned in such a way that they are as nearly enclosed as possible, and the portion of conveyor belt in contact with the solvent is also isolated by suitable means from contact with the internal environment of the painting chamber, in order to prevent the evaporation of the solvent. In a preferred solution, where rotating scraping cylinders are used, the solvent vessel is located in such a way that it is enclosed by the two successive cleaning cylinders, by the portion of conveyor belt running between these cylinders, and by its side walls which are as close as possible to the said cylinders and to the said portion of conveyor belt. At the end of each painting cycle, clean solvent is made to flow into the solvent vessel and the cleaning cylinders and the conveyor belt of the painting machine are temporarily kept active so that they clean themselves.

Further characteristics of the invention, and the advantages derived therefrom, will be made clear by the following description of some preferred embodiments of the invention, illustrated purely by way of example and without restrictive intent in the figures of the attached sheets of drawings, in which.

Figure 2:
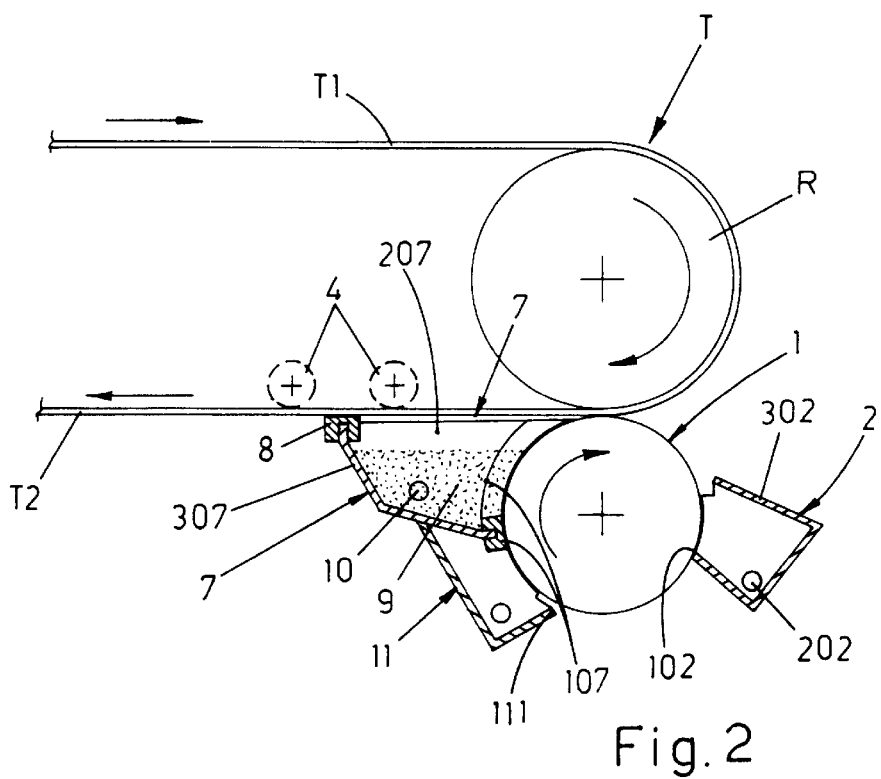
FIGS. 2, 3 and 4 show schematically and in lateral elevation the different embodiments of a device according to the invention, which carries out the cleaning in successive preliminary cleaning and finishing stages.

In FIG. 2, the letter T indicates the conveyor to be cleaned, running around the downstream roller R which, in the example in question, again rotates in a clockwise direction, in the same way as the preliminary cleaning cylinder 1, which operates in contact with the return branch T2 of T, parallel and in opposition to R, to remove the paint from T2 and to discharge it into the recovery and removal trough 2, as in the known art.

The lower part of the trough 2 is provided with a hole 202 connected to the known means of removing the recovered paint. According to the invention, the trough 2 can advantageously be provided with a top cover 302 which limits the exposure of the recovered paint to the air. The cover 302 can touch the cylinder 1 with its side walls, but does not touch this cylinder with its front transverse edge.

Immediately downstream from the preliminary cleaning cylinder 1, there is a vessel 7 provided with a U-shaped front edge 107, which is made from such material and shaped in such a way that it interacts in a sealed way with the lateral surface of the cylinder 1, and which is kept in contact with this cylinder by suitable means, the said vessel 7 being provided with lateral and transverse containing walls 207, 307 which are integral with each other and with the said sealing edge 107 and having a height such that they are as close as possible to the branch T2 of T, so that the vessel 7 in question is essentially closed by the conveyor T. A scraper blade 8 of suitable material is provided on the upper edge of the transverse wall 307 of the vessel 7, and is pressed by suitable means against the branch T2 to be cleaned, which is controlled if necessary by opposing rollers 4 of a known type. Solvent 9 is made to flow into the vessel 7 and is kept at a predetermined level, the said vessel being provided for this purpose, in its opposite lateral walls 207, with corresponding holes 10, one of which is connected to solvent delivery means, while the opposite hole is connected to a discharge channel. By rotating in contact with the solvent in the vessel 7, the cylinder 1 transfers a film of this solvent to the branch T2, to soften any residues of paint which are then removed by the scraper blade 8 and fall into the flow of solvent 9 by which they are removed. Clearly, the described solution resolves one of the problems of the known art, since the solvent vessel 7, the cylinder 1 and the portion of belt T2 in contact with the solvent are form an enclosure for each other to limit the evaporation of the said solvent. To prevent the dispersion of any leaks of product from the sealing edge 107 of the vessel 7, and therefore to enable the device to be made without highly precise tolerances, an auxiliary trough 11 can be arranged under the vessel 7 so that the edges of its walls can interact in contact with the vessel 7 and close to or in contact with the cylinder 1, but without touching this cylinder at least with its front transverse edge 111, to limit the amount of exposure of its internal parts to the air. The trough 11 can usefully be utilized as a channel for the return of the solvent discharged from the vessel 7, replacing the channel which makes the return available on the same side of the device as that on which the solvent delivery means operate. Should any traces of paint tend to pass beyond the scraper blade 102 of the trough 2, they would be recovered by the scraping carried out by the edge 107 on the cylinder 1 and would fall into the auxiliary trough 11.

Figure 1:
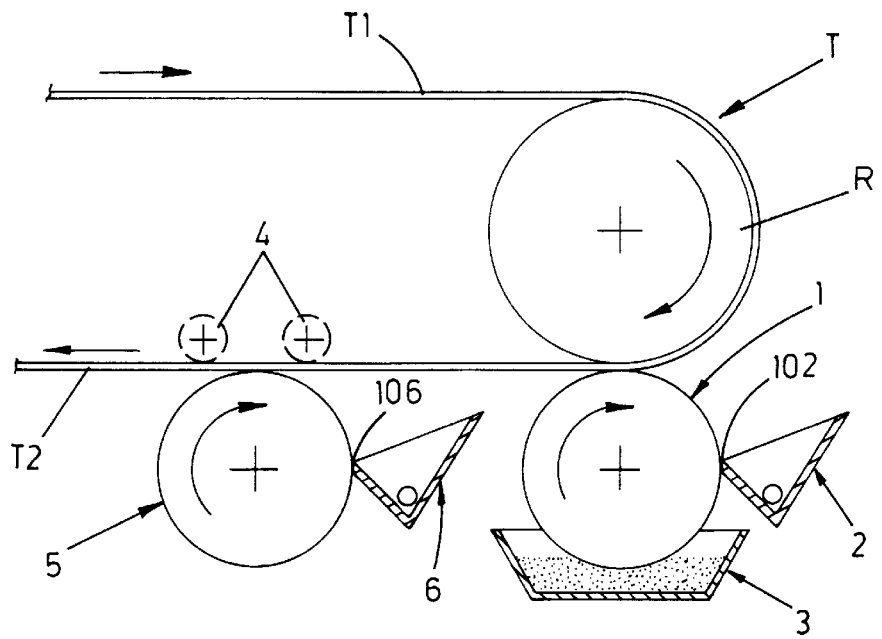
FIG. 1 shows schematically and in lateral elevation the known composite cleaning device described in the introductory part of the present description.
Figure 3:
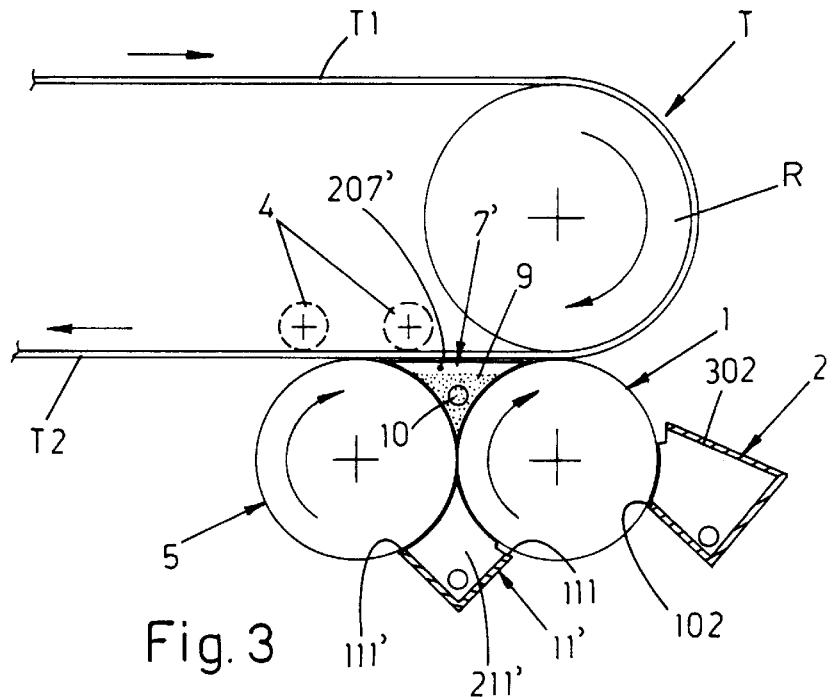

In the solution in FIG. 3, the preliminary cleaning cylinder 1 is used, with the corresponding sufficiently enclosed trough 2, and a finishing cylinder 5 similar to that in FIG. 1 is used in place of the preceding vessel 7, with the difference that the two cylinders are now placed in contact with each other, in such a way that, when the upwardly diverging space between the cylinders is enclosed with suitable lateral walls 207', and the walls 207' are designed in such a way that they essentially come into contact with the branch T2 of T, this space can be sealed from the ventilation air and it is possible to form a vessel 7' sealed with respect to the external environment, a correct quantity of solvent 9 being made to flow into this vessel to wet both cylinders 1 and 5 and the branch T2 of T running above, as is required for proper cleaning of the return branch of the conveyor T. The walls 207' of the vessel 7' are provided with holes 10 for the delivery and discharge of the solvent, which can return to the side of the device on which the delivery means operate, through a return channel parallel to the cylinders, or through an auxiliary trough 11' which is located in the downwardly diverging space between the cylinders 1, 5, and which preferably scrapes the cylinder 5 with its edge 111', but which does not touch the cylinder 1 with its edge 111. The trough 11' can operate with its lateral walls 211' in contact with the cylinders 1 and 5, so that it is essentially enclosed with respect to the external air flow. In the solution in FIG. 3, as in that of FIG. 2, the auxiliary trough 11' can recover any leaks of product from the upper vessel 7', or residues of paint which pass beyond the trough 2.

The cylinders 1 and 5 can rotate at equal or different speeds.

Figure 4:
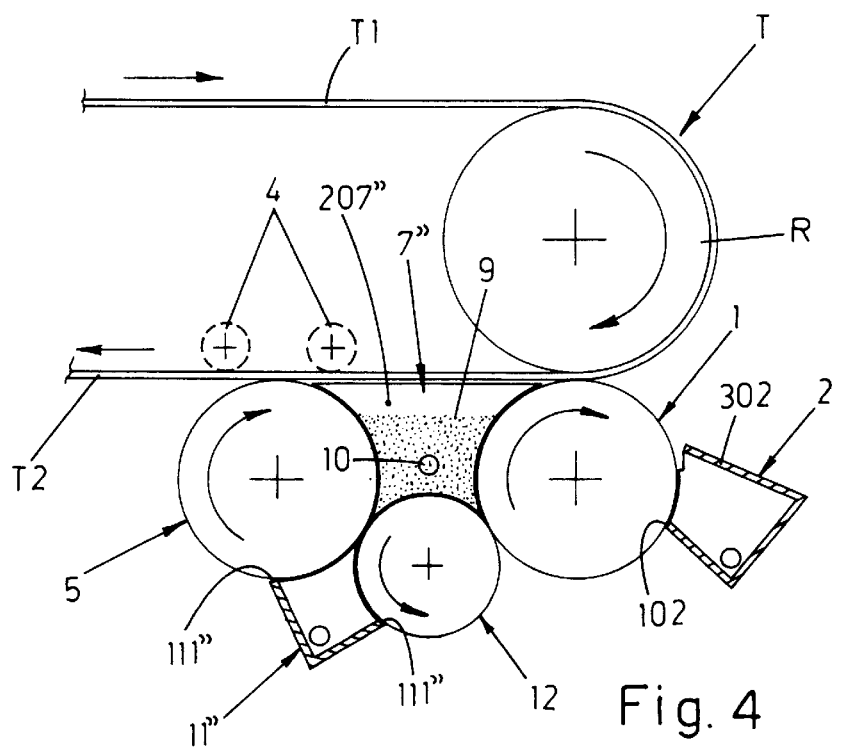

The solution of FIG. 4 differs from that of FIG. 3 in that the cylinders 1 and 5 are placed apart from each other and that a driven cylinder 12 is placed between them and touches both of the said cylinders with a seal.

Thus the solvent vessel 7" is completely closed at the bottom. To recover any residues of paint from the cylinders 5 and 12 and any leaks of product from the vessel 7", the auxiliary trough 11" can be placed under the cylinders 5 and 12, with both of its edges 111" scraping the cylinders, and can also be used as a channel for the return of the solvent which is made to flow into the said vessel 7".

To achieve thorough cleaning of the return branch T2 of the conveyor T, it is possible to use of the described devices, followed by one or more of the known cleaning devices described, for example, in the patent EP 448080 held by the applicant; or two devices of the type in question can be used, in series with each other. It is possible to use cleaning cylinders or scraper blades in the second device which have different characteristics of roughness from those of the cylinders or scraper blades of the first device, to improve cleaning in the case of products which are particularly difficult to recover.

Figure 5:
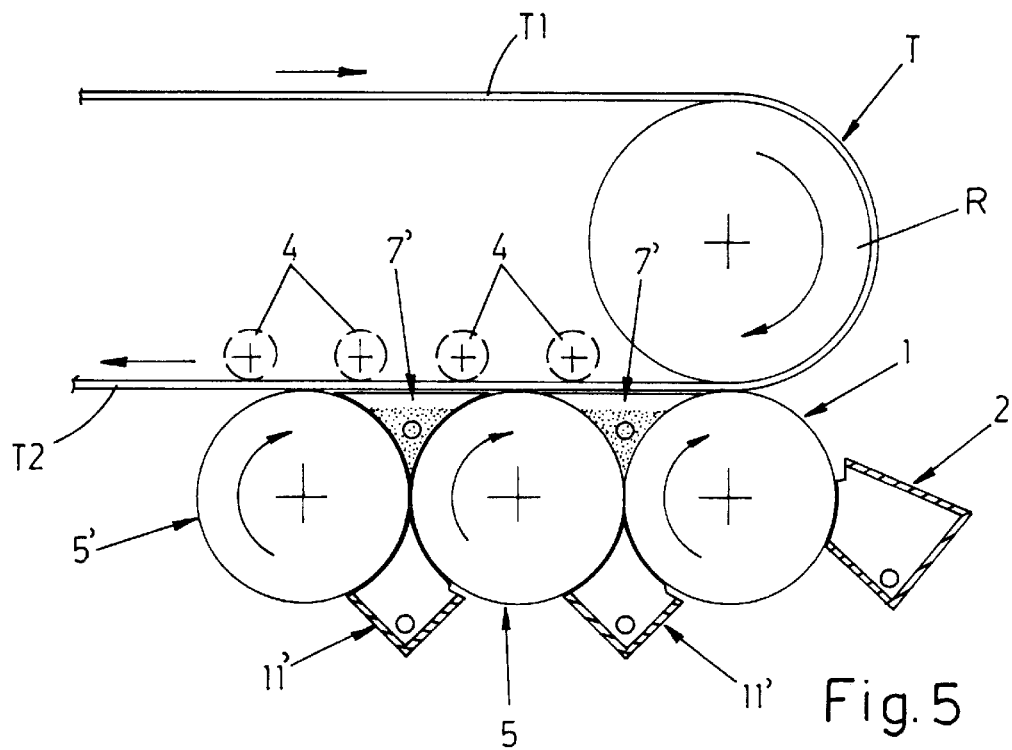
FIGS. 5 and 6 show schematically and in lateral elevation some possible composite solutions for the device according to the invention.

FIG. 5 shows, by way of example, how the device of FIG. 3 can be provided with a multiple cleaning function, by placing in contact with the branch T2 of the conveyor and with the cylinder 5 a similar parallel cylinder 5', rotating in the same direction. A solvent vessel 7' can be placed between the upper parts of the cylinders 5, 5' and an auxiliary trough 11' can be placed between the lower parts, these devices being identical, respectively, to the devices 7' and 11' described above.

Figure 6:
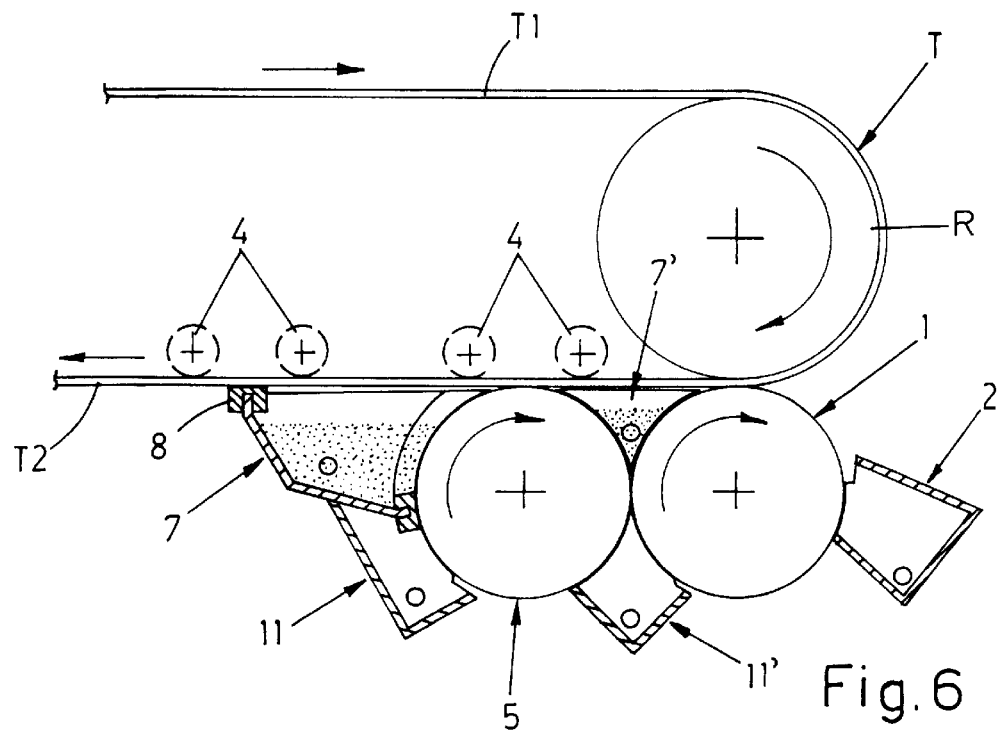

FIG. 6 shows how a multiple cleaning device can be formed by combining the solutions of FIG. 3 and FIG. 2. A vessel 7, with an auxiliary trough 11 if necessary, identical to those described with reference to FIG. 2, are placed adjacent to the cylinder 5 of a device such as that of FIG. 3.

It is to be understood that these considerations are also applicable to the device of FIG. 4, which can be made into a multiple cleaning device by the addition of parts 12, 5, 7", 11" of the said device of FIG. 4 and/or of parts 7, 11 or 5, 7' respectively of the device of FIG. 2 or the device of FIG. 3.

The cylinders of the described devices can be made from hard material, for example chromium-plated steel, or from relatively elastic material, for example rubber, and the selection of the material may depend on the acceptable friction between the cylinders and the branch T2 of the conveyor, or may depend on the seal required between the cylinders, or on specific requirements.

In addition to the advantages of containing the evaporation of the solvent used, it should be pointed out that, when the painting machine or installation is stopped, it is possible with this invention to start a stage of self-cleaning of the described devices, by keeping them temporarily active, together with the conveyor T, and pumping clean solvent into the vessels 7, 7', 7". At the end of the cleaning cycle, the vessel 7 in the device of FIG. 2 can be replaced if necessary, together with any auxiliary troughs 11, 11', 11" if these are not used for the return of the solvent.

Clearly, the self-cleaning of most of the components of the described devices also simplifies the necessary maintenance of the machine or installation at the end of each operating cycle.

It is to be understood that the improvements considered here are considered to be protected even if applied to cleaning devices other than those of FIG. 1, even if they are provided with cylinders rotating in the same direction, or rotating in the same direction as the direction of a advance of the conveyor belt, for the distribution of solvent on to the belt, or if they are provided with scraper blades in place of the scraping cylinders, or if they are designed to operate on a portion of the branch T2 of T arranged vertically instead of horizontally.

What is claimed is:

1. Device for cleaning a conveyor belt, which conveyor belt runs around a roller and includes an upper active branch and a lower return branch, said device being used to remove substances deposited on the conveyor belt and comprising:

a vessel containing
a solvent for the substances and
a distributing means to distribute the solvent onto a portion of the return branch of the conveyor to soften the substances deposited on the conveyor, a first scraping unit and a second scraping unit in succession along the return branch for scraping and cleaning the return branch to remove the substances with the solvent for subsequent recovery and removal, and enclosing means for enclosing, in a closed environment which is isolated from an external environment, the portion of the return branch of the conveyor and associated parts of said first and second units in contact with the solvent, in order to prevent or limit evaporation and dispersion of the solvent in the external environment wherein the first and the second scraping units of the return branch of the conveyor comprise respective first and second cylinders which are parallel to the return path of the conveyor, wherein the first cylinder is opposite the roller, wherein peripheries of the first and second cylinders rotate in an opposite direction to that of the return branch of the conveyor and touch the return branch to remove substances therefrom, wherein a scraper blade is provided to scrape removed substances from the first cleaning cylinder which were scraped from the return branch and to transfer the removed substances by gravity into a recovery and removal trough, wherein the peripheries of said first and second cylinders are positioned close to each other, and wherein a space between the first and second cylinders
is closed upwardly by the return branch of the conveyor,
is closed downwardly, and
is closed laterally by walls which form a seal with said first and second cylinders and which walls are arranged so that the walls essentially form an enclosure with the return branch of the conveyor such that said space forms said vessel which is thus isolated from the external environment and into which the solvent required for the process of cleaning the conveyor is made to flow.

2. Device according to claim 1, wherein the peripheries of said cylinders are in contact with each other to close the space downwardly.

3. Device according to claim 2, further comprising, under the vessel, an auxiliary trough having a transverse rear edge in contact with the second cylinder and a transverse front edge close to the first cylinder, said auxiliary trough collecting any leaks of solvent from the vessel and any residues of removed substances remaining on the peripheries of said first and second cylinders.

4. Device according to claim 1,
wherein the peripheries of said cylinders are positioned close to but spaced from each other, and
further including a third cylinder which is placed between said first and second cylinders and in contact with said first and second cylinders and which is rotated by said first and second cylinders,
wherein the space is between the first, second and third cylinders and the space is closed downwardly by the third cylinder.

5. Device according to claim 4, further comprising, under an area of contact between the second cylinder and the third cylinder, an auxiliary trough having transverse edges in contact with the second and third cylinders, said auxiliary trough collecting any leaks of solvent from the vessel and any residues of removed substances remaining on the peripheries of the second and third cylinders.

6. Device according to claim 5, wherein said auxiliary trough channels the collected solvent for return flow to the vessel.

7. Device according to claim 1, wherein the trough for the first cylinder of the conveyor is provided with an upper covering wall which limits exposure of the trough to the external environment.

8. Device according to claim 1, further including means, employed at an end of each operating cycle of the device, for keeping the device and the conveyor temporarily active, and for keeping clean solvent flow into the vessel to carry out an end cleaning of the cylinders.

9. Device according to claim 3, wherein said auxiliary trough channels the collected solvent for return flow to the vessel.

* * * * *